(12) United States Patent
Sun

(10) Patent No.: US 9,164,222 B2
(45) Date of Patent: Oct. 20, 2015

(54) BACKLIGHT MODULE

(71) Applicant: Szu-Wei Sun, Pingzhen (TW)

(72) Inventor: Szu-Wei Sun, Pingzhen (TW)

( * ) Notice: Subject to any disclaimer, the term of this patent is extended or adjusted under 35 U.S.C. 154(b) by 130 days.

(21) Appl. No.: 14/166,909

(22) Filed: Jan. 29, 2014

(65) Prior Publication Data

US 2015/0212254 A1     Jul. 30, 2015

(51) Int. Cl.
*F21V 8/00*     (2006.01)
*H01H 13/83*    (2006.01)

(52) U.S. Cl.
CPC ............ *G02B 6/0055* (2013.01); *G02B 6/0073* (2013.01); *G02B 6/0075* (2013.01); *H01H 13/83* (2013.01)

(58) Field of Classification Search
CPC .... H01H 13/83; G02B 6/0055; G02B 6/0073; G02B 6/0075
See application file for complete search history.

(56) References Cited

U.S. PATENT DOCUMENTS 5,883,684 A * 3/1999 Millikan et al. ................ 349/65

* cited by examiner

*Primary Examiner* — Mary Ellen Bowman

(57) ABSTRACT

A backlight module is provided with at least one light guide plate each including a plurality of openings; a white reflective film bent to conceal the at least one light guide plate and including a plurality of circuitries, a plurality of paired conductive terminals and a plurality of through holes; and at least one illumination unit disposed under the at least one light guide plate, each of the at least one illumination unit including a circuit member and a plurality of LEDs each disposed in one of the openings. The light emitted by the LEDs is directed to the at least one light guide plate and is further directed out of the white reflective film via the through holes.

14 Claims, 4 Drawing Sheets

BACKLIGHT MODULE

BACKGROUND OF THE INVENTION

1. Field of the Invention

The invention relates to backlighting and more particularly to such a backlight module including a white reflective film having plasma formed thereon, and an illumination unit having light-emitting diodes (LEDs) as light source, and the white reflective film being bent to conceal a light guide plate so that emitted light can be reflected by the bent white reflective film, and it can make the backlight module thinner and simplify the manufacturing processes.

2. Description of Related Art

Membranes are applicable to calculators, electronic scales, computer and keyboards having keys and integrated circuits (ICs). Printed circuit board for the membrane employs plasma as conductive material which is printed on substrate formed of polyethylene terephthalate (PET) by lithography. Next, the half-finished product is sent to a heater to heat for more than one hour in a temperature of 150-250° C. for curing. The employed plasma is typically heating-type plasma which adheres to other elements when temperature reaches about 150° C. However, the membrane may malfunction and have poor conductibility after such long period time of heating.

Typically, a backlight module and the membrane are provided in a keyboard so that a user can operate the keyboard under poor lighting conditions. The backlight module comprises a reflective plate, a transparent light guide plate disposed on the reflective plate for guiding light and allowing light to pass through, and a light emitting arrangement for emitting light toward the light guide plate. The light is reflected by the reflective plate and is guided by the light guide plate, thereby uniformly directing the light along the light guide plate. The membranes are disposed on the light guide plate. The membranes are formed of transparent material. Thus, a blocking layer (e.g., dark ink or opaque material) in an opaque area is provided to restricted the light only emmited through desired areas.

The light emitting arrangement is provided at one side of the light guide plate. Thus, distal portions of the light guide plate are insufficiently illuminated. Further, the stack construction of the conventional backlight module is relatively thick and its manufacturing process is complicated. Furthermore, the optical passage is formed by the transparent membranes made of PET and the light guide plate made of optical polycarbonate (PC). Silver Ink is provided in the circuit of the membranes for adhering purpose. However, the silver ink can absorb light. Thus, light passing the optical passage may have its strength decreased greatly due to the absorption. As a result, illumination is poor. Thus, the need for improvement still exists.

SUMMARY OF THE INVENTION

It is therefore one object of the invention to provide a backlight module comprising at least one light guide plate each including a plurality of openings; a white reflective film bent to conceal the at least one light guide plate and including a plurality of circuitries , a plurality of paired conductive terminals and a plurality of through holes; and at least one illumination unit disposed under the at least one light guide plate, each of the at least one illumination unit including a circuit member and a plurality of light-emitting diodes (LEDs) each disposed in one of the openings; wherein light emitted by the LEDs is directed to the at least one light guide plate and is further directed out of the white reflective film via the through holes.

The above and other objects, features and advantages of the invention will become apparent from the following detailed description taken with the accompanying drawings.

DETAILED DESCRIPTION OF THE INVENTION

Figure 1:
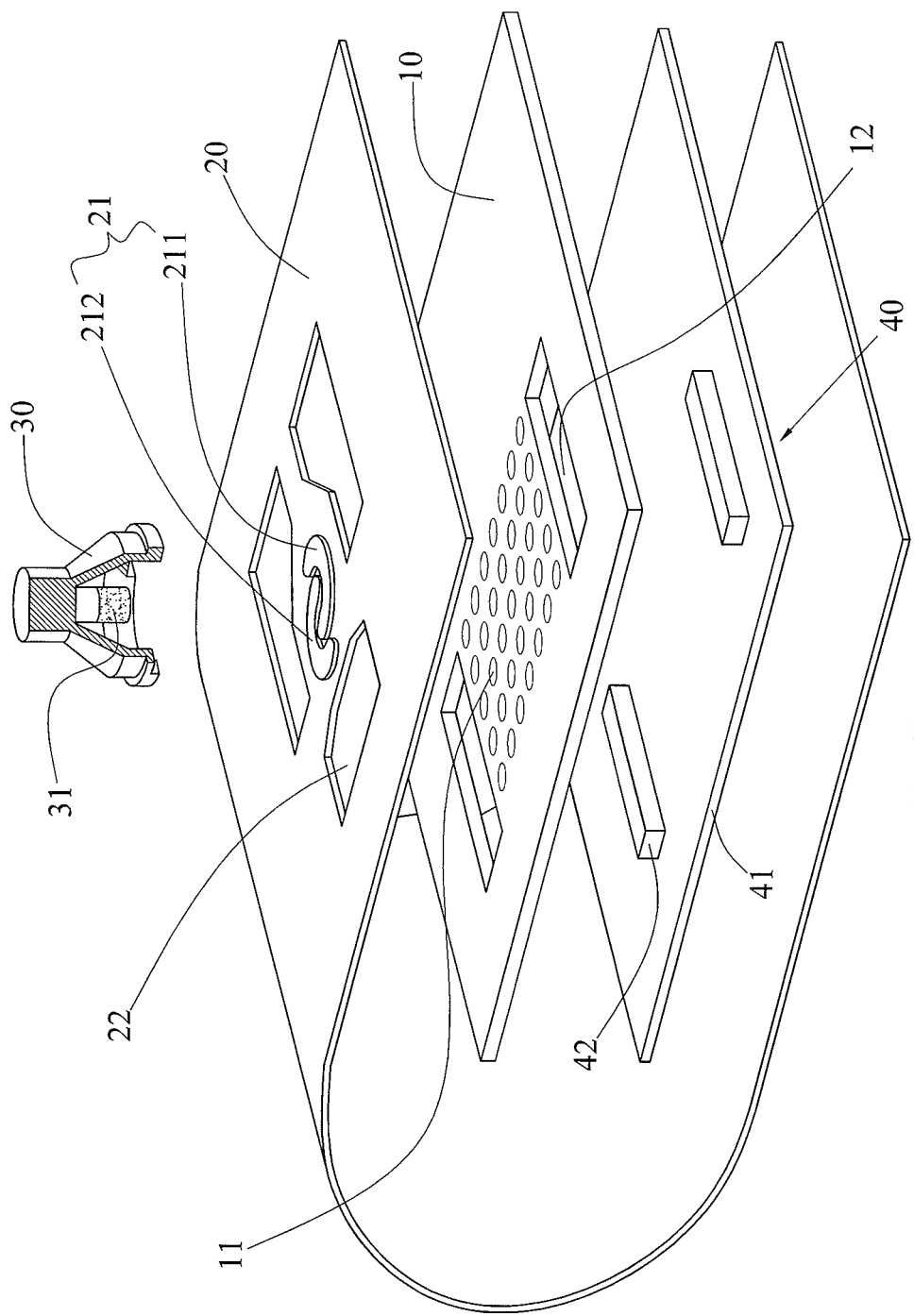
FIG. 1 is an exploded view of a backlight module according to a first preferred embodiment of the invention.
Figure 2:
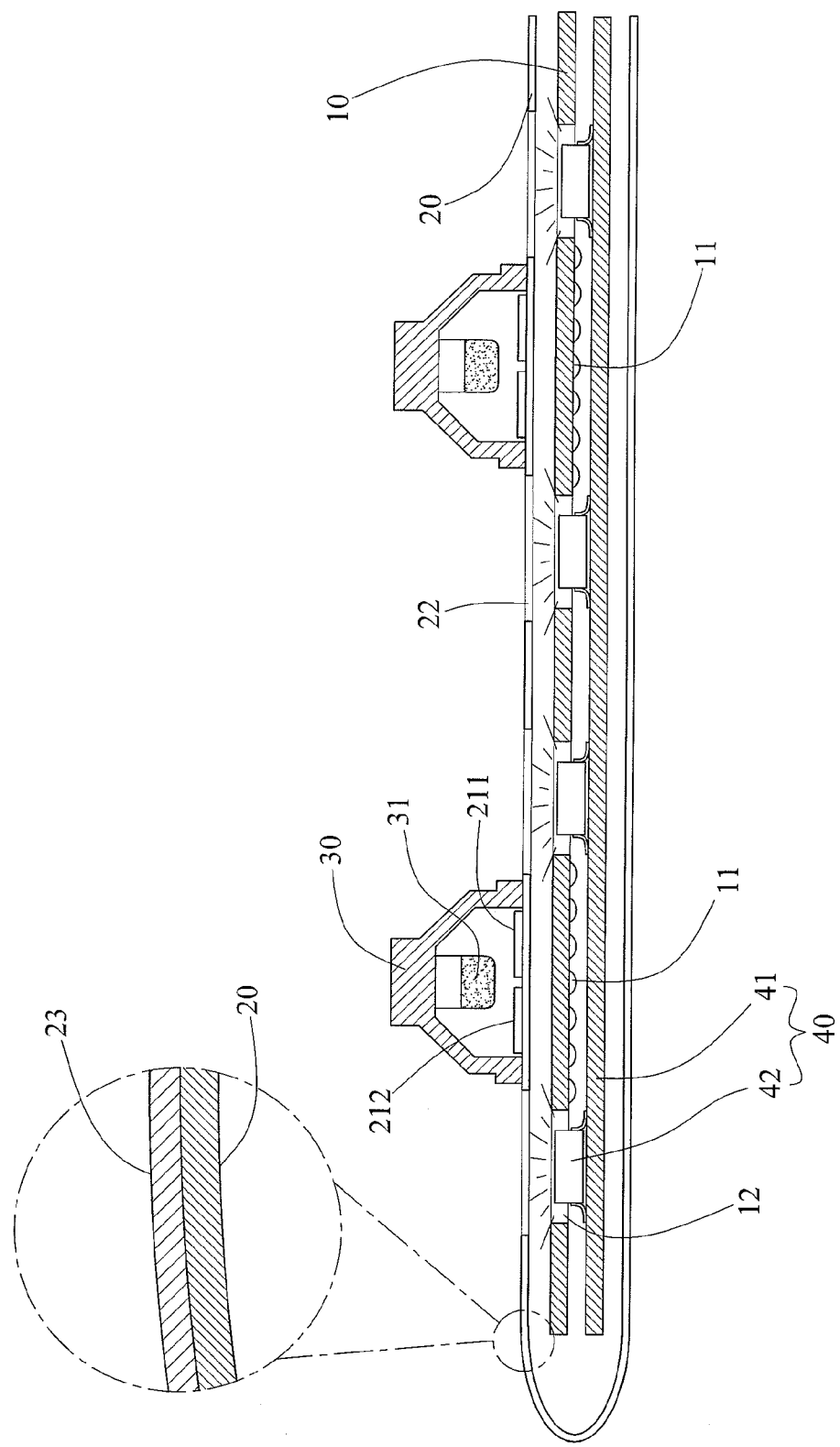
FIG. 2 is a longitudinal sectional of the assembled backlight module shown in FIG. 1.

Referring to FIGS. 1 and 2, a backlight module in accordance with a first preferred embodiment of the invention implemented in a keyboard is shown. The backlight module comprises the following components as discussed in detail below.

A light guide plate 10 is made of polycarbonate (PC) and is comprised of a plurality of openings 12. A white reflective film 20 comprises a plurality of circuitries , a plurality of paired conductive terminals 21, and a plurality of through holes 22. Each paired conductive terminals 21 including a positive terminal 211 and a negative terminal 212, The white reflective film 20 further comprises a protective layer 23 formed on the circuitries and the paired conductive terminals 21 for protection. A plurality of elastic domes 30 each are disposed on the paired conductive terminals 21 in a spaced manner. The elastic dome 30 comprises a stem shaped conductive contact 31 extending downward from a center of a concave bottom to dispose above the paired conductive terminals 21. An illumination unit 40 comprises a circuit member 41 and a plurality of light-emitting diodes (LEDs) 42 formed thereon. The LEDs 42 are disposed in the openings 12 directly under the through holes 22. The white reflective film 20 is bent to conceal both the light guide plate 10 and the illumination unit 40.

The circuitries and the paired conductive terminals 21 are formed on the white reflective film 20 by applying ultraviolet (UV) plasma or solution based plasma thereon. For UV plasma, it can be cured in several ten seconds by UV light rays emitted by a UV light. For solution based plasma, its substrate is rubber or acrylic. It is mixed with solution initially so that the applied solution based plasma will slowly cure in the air. For quick curing (e.g., in 30 minutes), the solution based plasma is required to heat at a temperature in the range of 70-80° C. This can prevent the paired conductive terminals 21 from being malfunctioned because the curing time is relatively short and the curing temperature is relatively low. The light guide plate 10 further comprises a plurality of reflective members 11 formed on an underside. The reflective members 11 are under the paired conductive terminals 21 and above the circuit member 41. The reflective members 11 are made of white ink of high reflective, diffusive or micro-structures.

In use, when a force is applied to the elastic dome 30 the conductive contact 31 moves downward to touch both the positive and negative terminals 211, 212 and hence connects the positive and negative terminals 211, 212, i.e., creating an electrical connection. A releasing of force applied to the elastic dome 30 disconnects the positive terminal 211 from the negative terminal 212 and hence open the circuit. As a result, a key pressing is finished.

The LEDs 42 are lit when the backlight module is activated. A great portion of light emitted by the LEDs 42 is directed out of the white reflective film 20 via the through holes 22. Further, a small portion of the light emitted by the LEDs 42 is impinged on the reflective members 11 which in turn reflect it out of the white reflective film 20 via the through holes 22. As a result, keys (not shown) can be lit more brightly.

Figure 3:
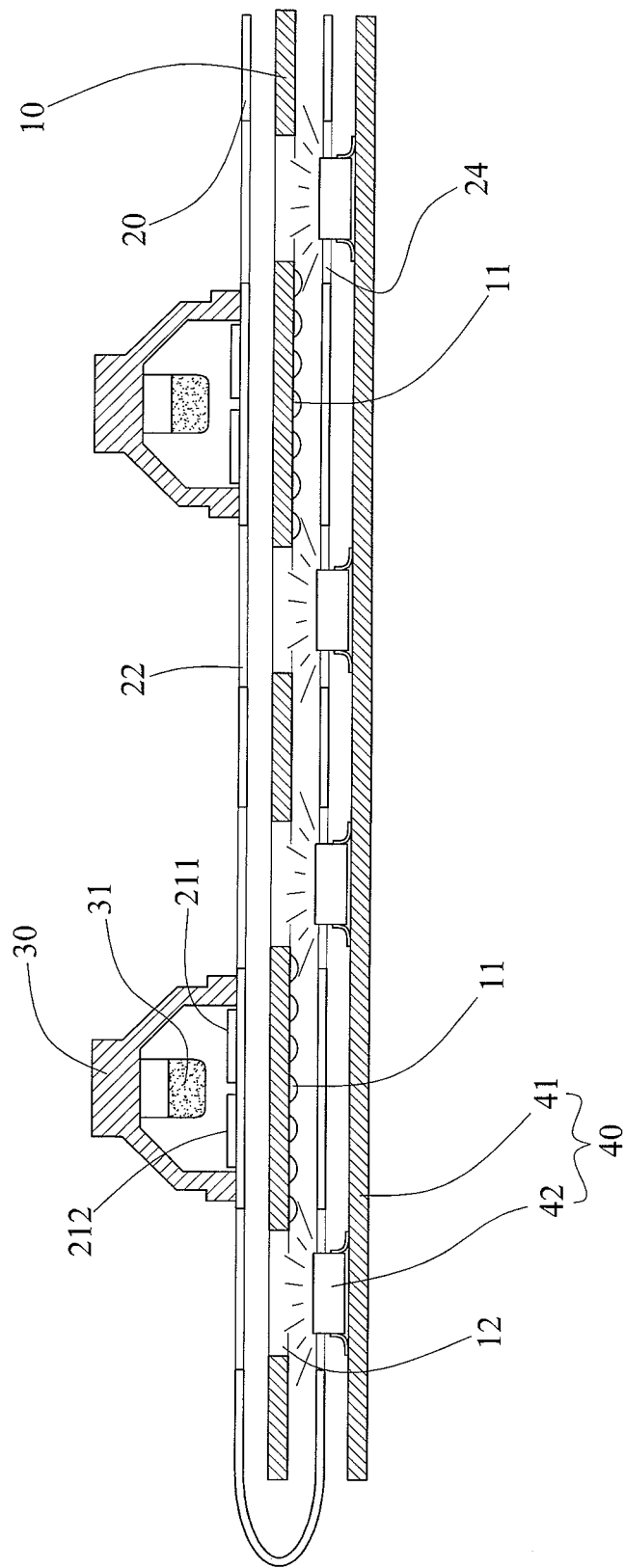
FIG. 3 is a longitudinal sectional of a backlight module according to a second preferred embodiment of the invention.

Referring to FIG. 3, a backlight module in accordance with a second preferred embodiment of the invention is shown. The characteristics of the second preferred embodiment are substantially the same as that of the first preferred embodiment except the following: The white reflective film 20 is bent to conceal the light guide plate 10 with the illumination unit 40 disposed below. The LEDs 42 are disposed in the through holes 24 directly under the openings 12.

Figure 4:
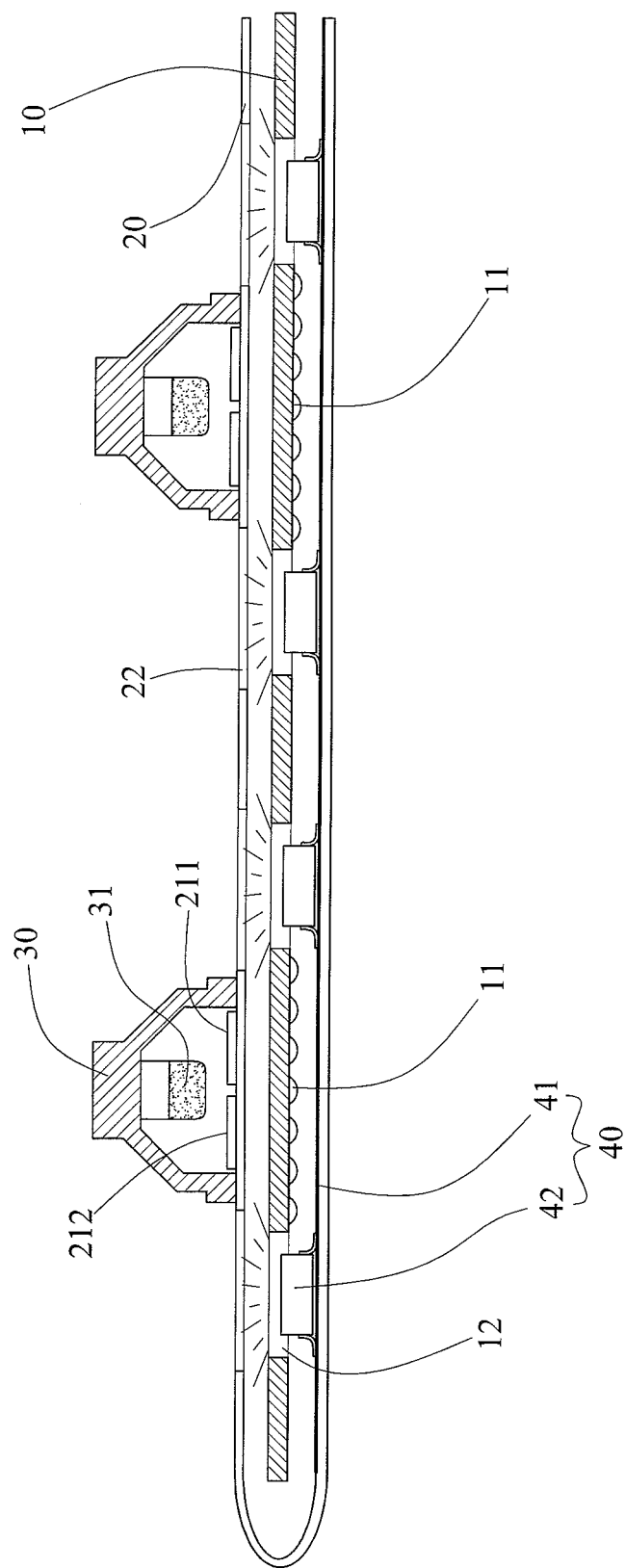
FIG. 4 is a longitudinal sectional of a backlight module according to a third preferred embodiment of the invention.

Referring to FIG. 4, a backlight module in accordance with a third preferred embodiment of the invention is shown. The characteristics of the third preferred embodiment are substantially the same as that of the first preferred embodiment except the following: The illumination unit 40 is disposed on a top of a bottom portion of the white reflective film 20.

It is envisaged by the invention that the following advantages can be obtained:

Thickness of the membrane can be reduced greatly by forming the circuitries and the paired conductive terminals 21 on the white reflective film 20.

The white reflective film 20 is bent to conceal the light guide plate 10 so that there is no need of additionally mounting a blocking layer in an opaque area. A plurality of through holes 22 are provided in the white reflective film 20 for eliminating the manufacturing step and saving cost. The LEDs 42 are disposed in the openings 12. Thus, emitted light can be directed by the bent white reflective film 20. It can make the backlight module thinner and simplifying the manufacturing processes.

Conductive terminals on the conventional membrane circuit member are disposed corresponding to contacts of a slot. Contacts of the membrane circuit member and the slot are required to adjust because the contacts may move up or down. Advantageously, it is only required to design circuit of the white reflective film 20 corresponding to the slot because the white reflective film 20 is bent to conceal the light guide plate 10. Thus, there is no need of adjusting the contacts of the membrane circuit member and the slot, thereby simplifying the manufacturing processes of the conventional membrane circuit member.

Both the UV plasma and solution based plasma prevents the circuitries and the paired conductive terminals from being malfunctioned and poor contact experienced by the conventional processes in the plasmas curing step. For UV plasma, it can be cured in several ten seconds by UV light rays emitted by a UV light. For solution based plasma, it can be quickly cured by subjecting to heat. As a result, yield is improved with cost decrease.

While the invention has been described in terms of preferred embodiments, those skilled in the art will recognize that the invention can be practiced with modifications within the spirit and scope of the appended claims.

What is claimed is:

1. A backlight module comprising:
    at least one light guide plate each including a plurality of openings;
    a white reflective film formed with a plurality of circuitries and a plurality of paired conductive terminals bent to conceal the at least one light guide plate and including a plurality of through holes; and
    at least one illumination unit disposed under the at least one light guide plate, each of the at least one illumination unit including a circuit member and a plurality of light-emitting diodes (LEDs) each disposed in one of the openings;
    wherein light emitted by the LEDs is directed to the at least one light guide plate and is further directed out of the white reflective film via the through holes.

2. The backlight module of claim 1, wherein the at least one illumination unit disposed under the at least one light guide plate concealed by the white reflective film.

3. The backlight module of claim 1, wherein the at least one illumination unit is disposed under the white reflective film, and wherein the LEDs disposed in the openings are directly under the through holes.

4. The backlight module of claim 1, wherein the at least one illumination unit is disposed on a top of a bottom portion of the white reflective film.

5. The backlight module of claim 1, further comprising a plurality of elastic domes each disposed on one of the paired conductive terminals, wherein each of the paired conductive terminals includes a positive terminal and a negative terminal, and wherein a pressing of one of the elastic domes creates an electrical connection of one of the paired conductive terminals.

6. The backlight module of claim 2, further comprising a plurality of elastic domes each disposed on one of the paired conductive terminals, wherein each of the paired conductive terminals includes a positive terminal and a negative terminal, and wherein a pressing of one of the elastic domes creates an electrical connection of one of the switches.

7. The backlight module of claim 3, further comprising a plurality of elastic domes each disposed on one of the paired conductive terminals, wherein each of the paired conductive terminals includes a positive terminal and a negative terminal, and wherein a pressing of one of the elastic domes creates an electrical connection of one of the paired conductive terminals.

8. The backlight module of claim 4, further comprising a plurality of elastic domes each disposed on one of the paired conductive terminals, wherein each of the paired conductive terminals includes a positive terminal and a negative terminal, and wherein a pressing of one of the elastic domes creates an electrical connection of one of the paired conductive terminals.

9. The backlight module of claim 5, wherein each of the elastic domes includes a conductive contact disposed above one of the paired conductive terminals so that a pressing of one of the elastic domes moves the conductive contact downward to touch both the positive and negative terminals, thereby connecting the positive and negative terminals to create an electrical connection.

10. The backlight module of claim 1, wherein the white reflective film further comprises a protective layer formed on the circuitries and the paired conductive terminals for protection.

11. The backlight module of claim 1, wherein the circuitries and the paired conductive terminals are formed on the white reflective film by applying ultraviolet (UV) plasma or solution based plasma thereon.

12. The backlight module of claim 1, wherein each of the at least one light guide plate further comprises a plurality of reflective members formed on an underside, the reflective members being disposed above the circuit member.

13. The backlight module of claim 12, wherein the reflective members are made of white ink of high reflective, diffusive or a plurality of micro-structures.

14. The backlight module of claim 1, wherein the at least one light guide plate is made of polycarbonate (PC).

* * * * *